United States Patent [19]
Uchida et al.

[11] Patent Number: 6,014,271
[45] Date of Patent: Jan. 11, 2000

[54] OBJECTIVE LENS FOR OPTICAL DISC

[75] Inventors: Morihiko Uchida, Tokyo; Takahiro Sugiyama, Saitama, both of Japan

[73] Assignee: Clarion Co., Ltd., Tokyo, Japan

[21] Appl. No.: 09/196,194

[22] Filed: Nov. 20, 1998

[30] Foreign Application Priority Data

Nov. 27, 1997 [JP] Japan ................................. 9-326266

[51] Int. Cl.$^7$ ................................................. G02B 13/18
[52] U.S. Cl. ........................... 359/719; 359/718; 359/708
[58] Field of Search ..................... 359/719, 708, 359/718

[56] References Cited

U.S. PATENT DOCUMENTS

Re. 34,455  11/1993  Arai et al. ............................... 359/719

FOREIGN PATENT DOCUMENTS 4-28282   5/1992   Japan .

*Primary Examiner*—Georgia Epps
*Assistant Examiner*—David N. Spector
*Attorney, Agent, or Firm*—McGinn & Gibb, P.C.

[57] ABSTRACT

An objective lens for an optical disc includes a positive single lens, disposed between a light source and the optical disc. The objective lens has a first surface directed to the light source and a second surface directed to the optical disc. The first surface has a convex shape and both the first surface and the second surface are aspheric. The objective lens satisfies the following condition: $1.0<|R2/R1|<1.2$, where R1 is the paraxial radius of curvature on the light source side surface and R2 is the paraxial radius of curvature on the optical disc side surface.

4 Claims, 3 Drawing Sheets

FIG.3  FIG.4

OBJECTIVE LENS FOR OPTICAL DISC

BACKGROUND OF THE INVENTION

1. Field of the Invention

This invention relates to an objective lens for an optical disc and an optical system thereof.

2. Description of the Related Art

FIG. 1 shows a general optical system used for detecting information recorded in an information-recording medium such as an optical disc. Namely, a ray of light emitted from a light source LD is collimated into a parallel ray of light by a collimate lens CL and the parallel light is converged on an information surface of an optical disc D by an objective lens OL to optically read out information of the optical disc. The light reflected on the information surface of the same optical disc D is again introduced into the objective lens OL to be collimated into the parallel ray of light. The light reflected by a half-mirror is converged into a detecting element PD by the collimate lens CL. An optical signal is converted into an electric signal by the detecting element PD, thereby converting the information of the optical disc into the electric signal. Incidentally, the system shown in FIG. 4 is referred to as "Infinite System".

Also, as shown in FIG. 2, the light emitted from the light source LD is directly converged on the information surface of the optical disc D by the objective lens OL, the information of the optical disc is optically read out. The light reflected thereon is again introduced into the objective lens OL, and the light is directly converged into the detecting element PD through the half-mirror M. Incidentally, the system shown in FIG. 5 is referred to as "Finite System".

In taking into consideration miniaturization, lightening, reliability and cost performance, it is advantageous to constitute the optical system by using the finite system in which the number of parts is fewer than that of the infinite system in the two optical systems mentioned above. Typical one of such optical systems is disclosed in Japanese examined Patent Publication No. Hei 4-28282.

However, the conventional objective lens disclosed above suffers the following problems.

In taking into consideration a convergence performance onto the information surface of the optical disc D, it is common for the radius of curvature of one side of a single lens into which the light is introduced to be smaller than that of the other side thereof from which the light is emitted. The conventional objective lens is shown in FIG. 3.

Moreover, all of the objective lenses disclosed in each of the examples in the Japanese examined Patent Publication No. Hei 4-28282 are made in such a manner that a radius of curvature r1 of the light introduced side is smaller than a radius of curvature r2 of the light emitted side, as shown in TABLE 1.

TABLE 1

|  | $r_2$ | $r_1$ | $|r_2/r_1|$ |
|---|---|---|---|
| Example 1 | −1.31979 | 0.63363 | 2.083 |
| Example 2 | −2.01409 | 0.69784 | 2.886 |
| Example 3 | −1.8412 | 0.71255 | 2.584 |
| Example 4 | −2.77870 | 0.70448 | 3.944 |
| Example 5 | −1.90409 | 0.77168 | 2.467 |
| Example 6 | −5.04983 | 0.95664 | 5.279 |
| Example 7 | −1.08514 | 0.69588 | 1.559 |
| Example 8 | −2.36833 | 1.11492 | 2.124 |

TABLE 1-continued

|  | $r_2$ | $r_1$ | $|r_2/r_1|$ |
|---|---|---|---|
| Example 9 | −0.87863 | 0.74996 | 1.172 |
| Example 10 | −1.51637 | 0.60545 | 2.505 |

However, an optical disc device is required to converge the light emitted from the light source LD on the information surface of the optical disc D by the objective lens OL. Furthermore, in the optical disc device, it is required that the converged ray of light be reflected on the information surface in the same optical disc D to again converge the light into the detecting element PD through the objective lens OL.

Therefore, if the convergence performance onto the detecting element PD is low (even if the convergence performance onto the information surface of the optical disc D is high), the system suffers from the problem that the information recorded on the optical disc can not be correctly read out.

Moreover, recently, because the optical system for the optical disc has to be miniaturized in accordance with miniaturization of the optical disc device, the convergence performance onto the detecting element PD is required to further be improved.

SUMMARY OF THE INVENTION

The present invention is designed to solve the aforementioned problem according to the prior art. An object of the invention is to provide an objective lens for an optical disc having high convergence precision to improve performance of the detecting element while keeping the image formation performance of the optical disc high.

To achieve this and other objects, an aspect of the present invention is to provide an objective lens for an optical disc disposed between the light source and the optical disc, which is a positive single lens whose convex surface is directed to the light source, of which both the side of surfaces of which one is directed to the light source and the other is directed to the optical disc have aspheric surfaces, and which satisfies the following conditions:

(a) $1.0 < |R2/R1| < 1.2$
(b) $0.15 \leq |M| \leq 0.3$
(c) $|ZR1| < |ZR2|$
(d) $|Z1\,(H)| < |Z1\,(Y)|\,(0 < H < Y)$
(e) $|Z2\,(H)| < |Z2\,(Y)|\,(0 < H < Y)$ where origin points are defined as the tops of the opposing surfaces of the objective lens;

R1 is the paraxial radius of curvature on the light source side surface;

R2 is the paraxial radius of curvature on the optical disc side surface;

M is the transverse magnification of the lens;

ZR1 is the diameter of the light source side surface;

ZR2 is the diameter of the optical disc side surface;

Z1 (H) is the distance from a point on the light source side surface to the origin point, where height from the optical axis is H;

Z1 (Y) is the distance from a point on the light source side surface to the origin point, where height from the optical axis is Y;

Z2 (H) is the distance from a point on the optical disc side surface to the origin point, where height from the optical axis is H; and Z2 (Y) is the distance from a point on the optical disc side surface to the origin point, where height from the optical axis is Y, in which H and Y are within the corresponding paraxial radius.

According to the invention, the condition (a) is used to define a relationship between the paraxial radius of curvature of the light source side surface R1 and that of the optical disc side surface R2.

Namely, in the case where a value of |R2/R1| is greater than 1.2, though this improves the image formation performance on the optical disc, the above case is not preferable because the image formation performance on the detecting device would be degraded. On the contrary, in the case where the value of |R2/R1| is less than 1.0, though this improves the image formation performance on the detecting device, this case is not preferable because the image formation performance on the optical disc would be degraded.

The condition (b) is used to define a region of the magnification of the image formation in which the objective lens is used in the present invention. Namely, if the magnification of the image formation exceeds the upper limit, numerical apertures on the light source side are more than the numerical apertures on the image side, whereby an incidence angle at which the light in the marginal region is introduced into the objective lens is so large that it becomes difficult to compensate for a wave front aberration. On the contrary, if the magnification of the image formation is below the lower limit, though this compensates for the wave front aberration, it is difficult to produce a compact optical system because the focal length must be made longer to keep an operation distance required for the optical system. Therefore, it is preferable for the inventive objective lens that the region of the magnification of the image formation is between 0.15 and 0.3.

The condition (c) is used to define shapes of both the surfaces on the light source side and the optical disc side of the present invention. That is, if |ZR1| is larger than |ZR2|, the image formation performance is degraded on the detecting element, whereby the object of the present invention cannot be achieved.

The conditions (d) and (e) are used to define shapes of the aspheric surfaces on the light source side and the optical disc side. In the case where Z1(H) is larger than Z1(Y) or Z2(H) is larger than Z2(Y) in spite of satisfying the above relationship, an inflection point exists on the aspheric surface. When the objective lens for the optical disc has an inflection point on the aspheric surface, steps to compensate for the above must be considered. As a result, the lens that has been produced would be expensive.

The objective lens for the optical disc according to the invention which satisfies the above defined conditions is formed in such a manner that the paraxial radius of curvature of the surface into which the light is entered (the light source side) is the same as that of the surface from which the light is emitted (the optical disc side) and aspheric coefficients of both the sides of the objective lens are chosen properly, so that the curvature of the light introduced side is larger than that of the light emitted side. As a result, the inventive objective lens has a high convergence precision which improves the performance of the detecting element, while keeping the image formation performance on the information surface of the optical disc high.

The above defined objective lens is used for an optical pickup device that includes a light source, either an optical medium for a light receiving element or a plate-like transparent body, an objective lens and an optical disc. In this case, the optical pickup device is positioned in the optical axis of the light source, on either the optical medium, the plate-like body, the objective lens, or the optical disc.

DETAILED DESCRIPTION OF THE EXAMPLES

Figures 1, 2:
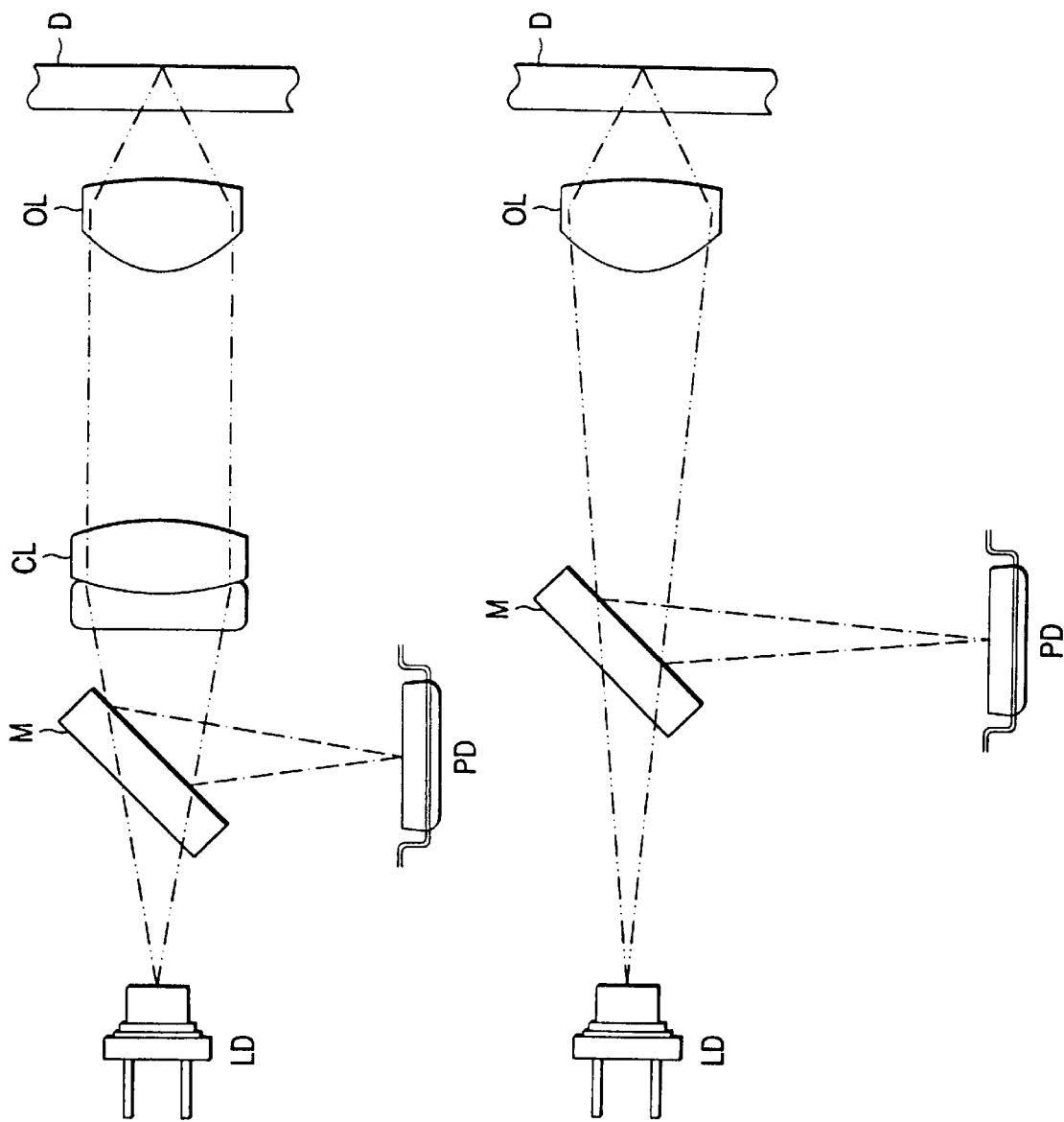
FIG. 1 is a conventional optical system called an infinite system.
FIG. 2 is another conventional optical system called the infinite system.

Examples will be given of the objective lens for the optical disc of the present invention as follows referring to the accompanying drawings. In addition to the above, the reference characters are defined as follows.

d is the thickness of the objective lens;

N is the refractive index of the lens in the case where a wavelength is 780 $\mu$m;

NA is the numerical aperture; and

WD is the operation distance.

The thickness of a cover glass is 1.2 mm and the refraction index of the cover glass is 1.55.

Hereinafter, a surface of the optical lens directed to the light source side is referred to as a first surface and the other surface thereof directed to the optical disc is referred to as a second surface.

The aspheric shapes of the surfaces of the light source side and the optical disc side are respectively represented in rectangular coordinates in which each of the tops of the opposing surfaces of the objective lens is defined as the origin point and the Z-axis is defined as the direction of the optical axis, where H is a height from the optical axis, as follows:

$$Z_j = \frac{C_j \cdot H_j^2}{1 + \sqrt{1 - (k_j + 1) \cdot C_j^2 \cdot H_j^2}} + A_{1j} \cdot H_j^4 + A_{3j} \cdot H_j^8 + A_{4j} \cdot H_j^{10} \quad (1)$$

where $H_j$ is the height from the optical axis on the j-th surface (j=1,2);

$Z_j$ is the distance in the optical axis direction from a tangential plane tangent to a point where a height from the optical axis is $H_j$, to the optical axis on the j-th surface (j=1,2);

$C_j$ is $1/R_j$;

$R_j$ is the radius of curvature in the paraxial direction;

$K_j$ is the conic constant of the j-th surface; and $A_{1j}, A_{2j}, A_{3j}$ and $A_{4j}$ are the aspheric coefficients.

EXAMPLE 1

F=2.928

M=1/4.5

R1=2.54000

R2-2.54979
d=2.430
N=1.51922
NA=0.45
Wd=1.848

TABLE 2

Aspheric Coefficients

| | The first surface | The second surface |
|---|---|---|
| K | $-0.108016 \times 10^1$ | $-0.908246$ |
| A1 | $-0.640957 \times 10^{-2}$ | $+0.116397 \times 10^{-1}$ |
| A2 | $-0.223361 \times 10^{-2}$ | $-0.498123 \times 10^{-2}$ |
| A3 | $+0.410737 \times 10^{-3}$ | $+0.501327 \times 10^{-4}$ |
| A4 | $-0.350889 \times 10^{-3}$ | $+0.483135 \times 10^{-4}$ |

TABLE 3

The shift value in the effective radius marginal region

| H | ZR1 | ZR2 |
|---|---|---|
| 1.1 | 0.2239 | $-0.2298$ |
| 1.2 | 0.2618 | $-0.2740$ |
| 1.3 | 0.3003 | $-0.3231$ |
| 1.4 | 0.3379 | $-0.3776$ |
| 1.5 | 0.3722 | $-0.4384$ |

In the first example, the optical lens satisfies the condition (a) because $|R2/R1|=1.00385$. Also, the optical lens satisfies the condition (b) because $|M|=0.222$. Further, as shown in TABLE 3, the optical lens satisfies the condition (c) because of $|ZR1|<|ZR2|$. Also, the results after calculating Z1 (H) and Z2 (H) by the Formula (1) are shown in Tables 4 and 5. As shown in the tables, the optical lens satisfies the conditions (d) and (e) because of $|Z1\ (H)|<|Z1\ (Y)|$ and $|Z2\ (H)|<|Z2\ (Y)|$, where $0<H<Y$.

TABLE 4

Example 1

The light source side

| Z1 (1.1) | 0.22411 |
|---|---|
| Z1 (1.2) | 0.26205 |
| Z1 (1.3) | 0.30062 |
| Z1 (1.4) | 0.33826 |
| Z1 (1.5) | 0.37259 |

TABLE 5

Example 1

The optical disc side

| Z2(1.1) | $-0.22985$ |
|---|---|
| Z2(1.2) | $-0.27405$ |
| Z2(1.3) | $-0.32312$ |
| Z2(1.4) | $-0.37769$ |
| Z2(1.5) | $-0.43852$ |

Figure 5:
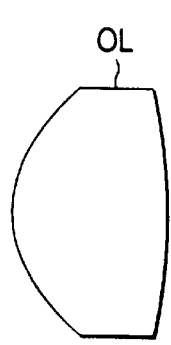
FIG. 5 are graphs showing a transmitted wave surface aberration in the objective lens according to a first example.
Figure 5:
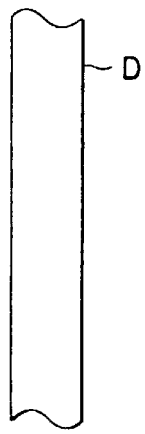
Figure 5:
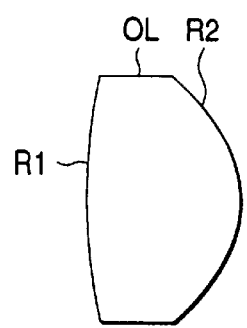
Figure 5:
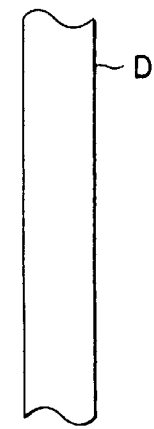
Figure 5:
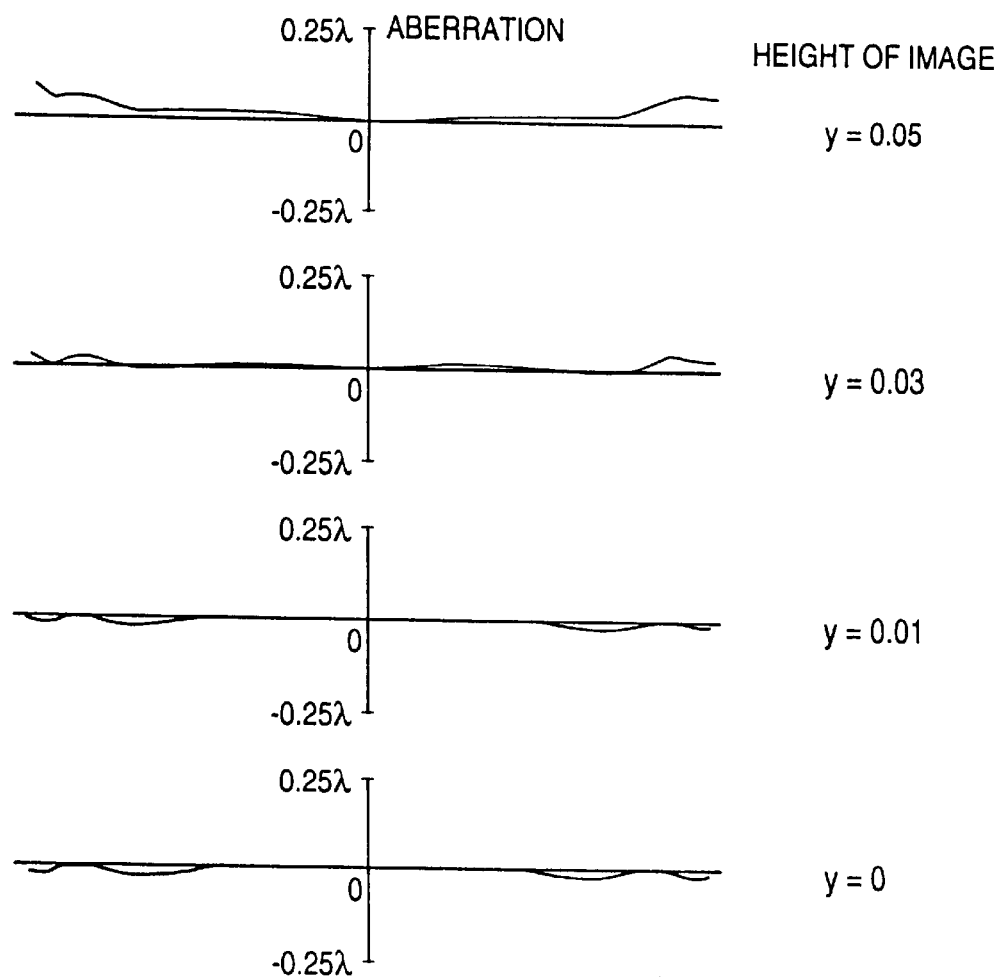
Figure 6:
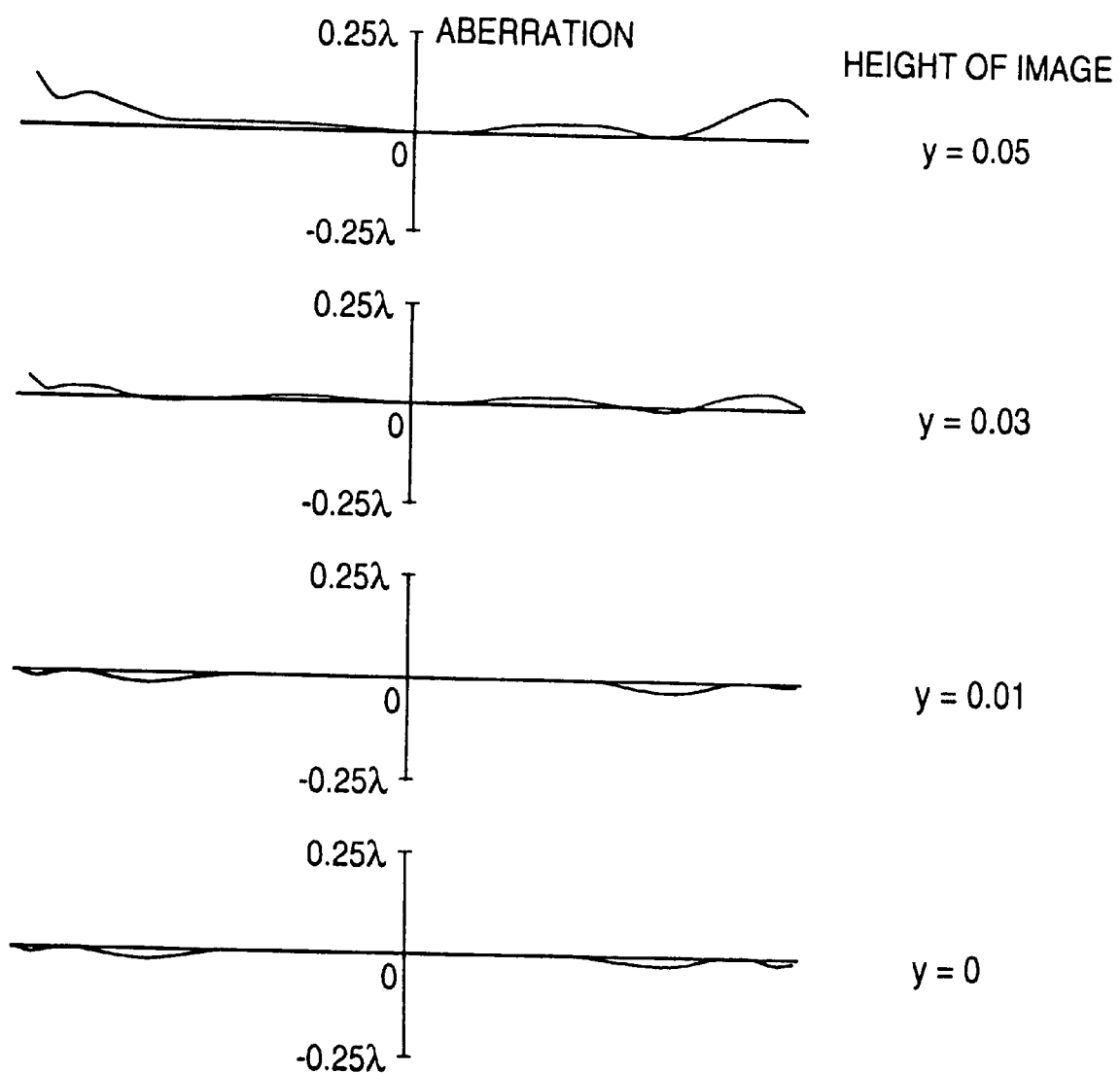
FIG. 6 are graphs showing the aberration of the transmitted wave surface in the objective lens according to a second example.
Figure 4:
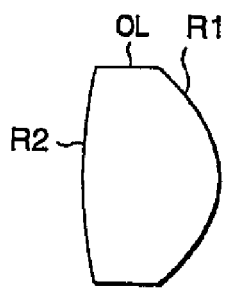
FIG. 4 is a schematic illustration showing a construction of an objective lens for an optical disc according to the present invention.
Figure 4:
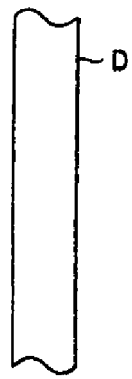
Figure 5:
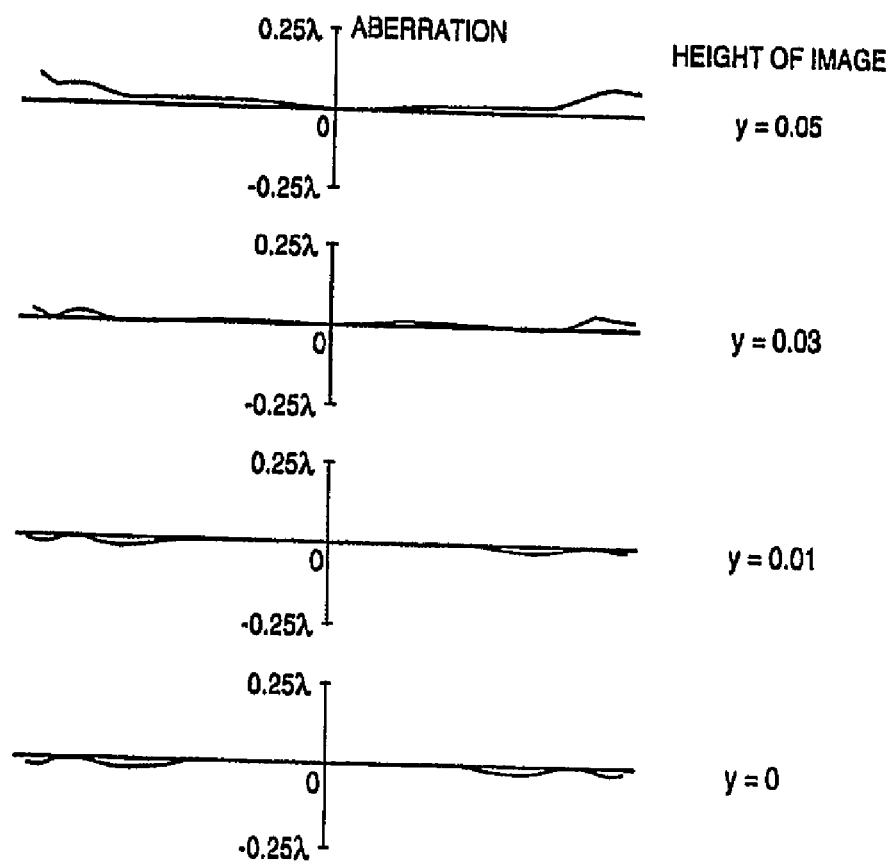

The objective lens as described in Example 1 such as the above is formed as shown in FIG. 4, and an aberration graph where the height of the image is varied between 0 and 0.05 is shown is FIG 5. In addition, in FIG. 5, the vertical axis indicates the aberration of the transmitted wave surface and the horizontal axis indicates an effective visual field of the lens.

According to the Example 1, the objective lens satisfying each of the above conditions can conduct readout with high precision because the aberration of the transmitted wave surface is small.

EXAMPLE 2

F=2.800
M=−115.0
R1=2.43000
R2=−2.55008
d=2.100
N=1.51922
NA=0.45
WD=1.759

TABLE 6

Aspheric Coefficients

| | The first surface | The second surface |
|---|---|---|
| K | $-0.122971 \times 10^1$ | $-0.895677$ |
| A1 | $-0.677000 \times 10^{-2}$ | $+0.898595 \times 10^{-2}$ |
| A2 | $-0.374787 \times 10^{-2}$ | $-0.463726 \times 10^{-2}$ |
| A3 | $+0.120019 \times 10^{-2}$ | $+0.984744 \times 10^{-3}$ |
| A4 | $-0.891418 \times 10^{-3}$ | $+0.235854 \times 10^{-3}$ |

TABLE 7

The shift value in the effective radius marginal region

| H | ZR1 | ZR2 |
|---|---|---|
| 1.1 | 0.2298 | $-0.2349$ |
| 1.2 | 0.2666 | $-0.2819$ |
| 1.3 | 0.3022 | $-0.3351$ |
| 1.4 | 0.3335 | $-0.3954$ |
| 1.5 | 0.3556 | $-0.4641$ |

In the second example, the optical lens satisfies condition (a) because $|R2/R1|=1.0494$. Also, the optical lens satisfies condition (b) because $|M|=0.20$. Further, as shown in TABLE 3, the optical lens satisfies condition (c) because $|ZR1|<|ZR2|$. Also, TABLE 8 and 9 show a result of calculations of Z1 (H) and Z2 (H) by the Formula (1).

As shown in the tables, the optical lens satisfies conditions (d) and (e) because $|Z1\ (H)|<|Z1\ (Y)|$ and $|Z2\ (H)|<|Z2\ (Y)|$, where $0<H$, Y and $H<Y$.

TABLE 8

Example 2

The light source side

| Z1(1.1) | 0.22980 |
|---|---|
| Z1(1.2) | 0.26666 |
| Z1(1.3) | 0.30226 |
| Z1(1.4) | 0.33356 |
| Z1(1.5) | 0.35562 |

TABLE 9

Example 2

The optical disc side

| Z2 (1.1) | $-0.23494$ |
|---|---|
| Z2 (1.2) | $-0.28195$ |

TABLE 9-continued

Example 2

The optical disc side

| | |
|---|---|
| Z2 (1.3) | −0.33510 |
| Z2 (1.4) | −0.39543 |
| Z2 (1.5) | −0.46413 |

Figure 3:
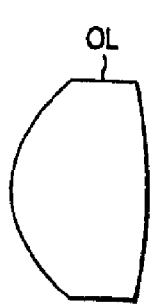
FIG. 3 is a schematic illustration showing a construction of a conventional objective lens for the optical disc.
Figure 3:

In the objective lens described in Example 2, the aberration graph in the case where the height of the image is varied between 0 and 0.05 is shown in FIG. 3. In addition, as also shown in FIG. 3, the vertical axis indicates the aberration of the transmitted wave surface and the horizontal axis indicates an effective visual field of the lens.

The objective lens of Example 1, satisfying each of the above conditions, can conduct the readout with high precision because the aberration of the transmitted wave surface is small, even if height of the image y is varied.

As described above, the inventive objective lens has high convergence precision into the detecting element while keeping the image formation performance onto the information surface of the optical disc high.

What is claimed is:

1. An objective lens for an optical disc comprising a positive single lens, disposed between a light source and the optical disc, said objective lens having:

a first surface directed to said light source; and a second surface directed to said optical disc, wherein:

said first surface has a convex shape; and both said surfaces are aspheric, said objective lens satisfies the following conditions:

(a) $1.0 < |R2/R1| < 1.2$ (b) $0.15 \leq |M| \leq 0.3$ (c) $|ZR1| < |ZR2|$ (d) $|Z1(H)| < |Z1(Y)|$ and $0 < H < Y$ (e) $|Z2(H)| < |Z2(Y)|$ and $0 < H < Y$ where R1 is the paraxial radius of curvature on the light source side surface;

R2 is the paraxial radius of curvature on the optical disc side surface;

M is the transverse magnification of the lens;

ZR1 is the diameter of the light source side surface;

ZR2 is the diameter of the optical disc side surface;

Z1 (H) is the distance from a point on the light source side surface to the origin point, where height from the optical axis is H;

Z1 (Y) is the distance from a point on the light source side surface to the origin point, where height from the optical axis is Y;

Z2 (H) is the distance from a point on the optical disc side surface to the origin point, where height from the optical axis is H; and Z2 (Y) is the distance from a point on the optical disc side surface to the origin point, where height from the optical axis is Y, wherein H and Y are within the corresponding paraxial radius.

2. An optical system for an optical pickup device comprising:

a light source;

one of an optical medium for a light receiving element and a plate shaped transparent body;

an optical disc; and an objective lens for the optical disc comprising a positive single lens, wherein said optical pickup device is formed in such a manner that said light source, one of said optical medium and said plate shaped transparent body, said objective lens and said optical disc, said objective lens having:

a first surface directed to said light source; and a second surface directed to said optical disc, wherein:

said first surface has a convex shape; and both said surfaces are aspheric, said objective lens satisfies the following conditions:

(a) $1.0 < |R2/R1| < 1.2$ (b) $0.15 \leq |M| \leq 0.3$ (c) $|ZR1| < |ZR2|$ (d) $|Z1(H)| < |Z1(Y)|$ and $0 < H < Y$ (e) $|Z2(H)| < |Z2(Y)|$ and $0 < H < Y$ where R1 is the paraxial radius of curvature on the light source side surface;

R2 is the paraxial radius of curvature on the optical disc side surface;

M is the transverse magnification of the lens;

ZR1 is the diameter of the light source side surface;

ZR2 is the diameter of the optical disc side surface;

Z1 (H) is the distance from a point on the light source side surface to the origin point, where height from the optical axis is H;

Z1 (Y) is the distance from a point on the light source side surface to the origin point, where height from the optical axis is Y;

Z2 (H) is the distance from a point on the optical disc side surface to the origin point, where height from the optical axis is H; and Z2 (Y) is the distance from a point on the optical disc side surface to the origin point, where height from the optical axis is Y, wherein H and Y are within the corresponding paraxial radius.

3. An objective lens as claimed in claim 1, wherein the following formula determines surface shapes of said first surface and said second surface: $Z_j =$ $$\frac{C_j \cdot H_j^2}{1 + \sqrt{1 - (k_j + 1) \cdot C_j^2 \cdot H_j^2}} + A_{1j} \cdot H_j^4 + A_{2j} \cdot H_j^6 + A_{3j} \cdot H_j^8 + A_{4j} \cdot H_j^{10}$$

where:

$H_j$ is the height from the optical axis on the j-th surface (j=1, 2);

$Z_j$ is the distance in the optical axis direction from a tangential plane tangent to a point where a height from the optical axis is $H_j$, to the optical axis on the j-the surface (j=1,2);

$C_j$ is $1/R_j$;

$R_j$ is the radius of curvature in the paraxial direction on the j-th surface;

$K_j$ is the conic constant of the j-th surface; and $A_{1j}, A_{2j}, A_{3j}$ and $A_{4j}$ are the aspheric coefficients on the j-th surface.

4. An optical system as claimed in claim 2, wherein the following formula determines surface shapes of said first surface and said second surface:

$$\frac{C_j \cdot H_j^2}{1+\sqrt{1-(k_j+1)\cdot C_j^2 \cdot H_j^2}} + A_{1j}\cdot H_j^4 + A_{2j}\cdot H_j^6 + A_{3j}\cdot H_j^8 + A_{4j}\cdot H_j^{10}$$

where:

$H_j$ is the height from the optical axis on the j-th surface (j=1,2)'

$Z_j$ is the distance in the optical axis direction from a tangential plane target to a point where a height from the optical axis is $H_j$, to the optical axis on the j-th surface (j=1,2);

$C_j$ is $1/R_j$;

$R_j$ is the radius of curvature in the paraxial direction on the j-th surface;

$K_j$ is the conic constant of the j-the surface; and $A_{1j}, A_{2j}, A_{3j}$ and $A_{4j}$ are the aspheric coefficients on the j-th surface.

* * * * *

UNITED STATES PATENT AND TRADEMARK OFFICE
CERTIFICATE OF CORRECTION

PATENT NO. : 6,014,271
APPLICATION NO. : 09/196194
DATED : January 11, 2000
INVENTOR(S) : Morihiko Uchida and Takahiro Sugiyama It is certified that error appears in the above-identified patent and that said Letters Patent is hereby corrected as shown below:

In the drawings, at Sheet 2 of 3, Figure 4, change the occurrence of "R1" to --R2--, and correspondingly, the occurrence of "R2" to --R1--, as shown in the attached.

Signed and Sealed this

Twentieth Day of March, 2007

JON W. DUDAS
*Director of the United States Patent and Trademark Office*